INVENTORS
STEN SODERBERG
JOHN T. MULLER
BY
ATTORNEYS

INVENTORS
STEN SODERBERG
JOHN T. MULLER
BY
ATTORNEYS

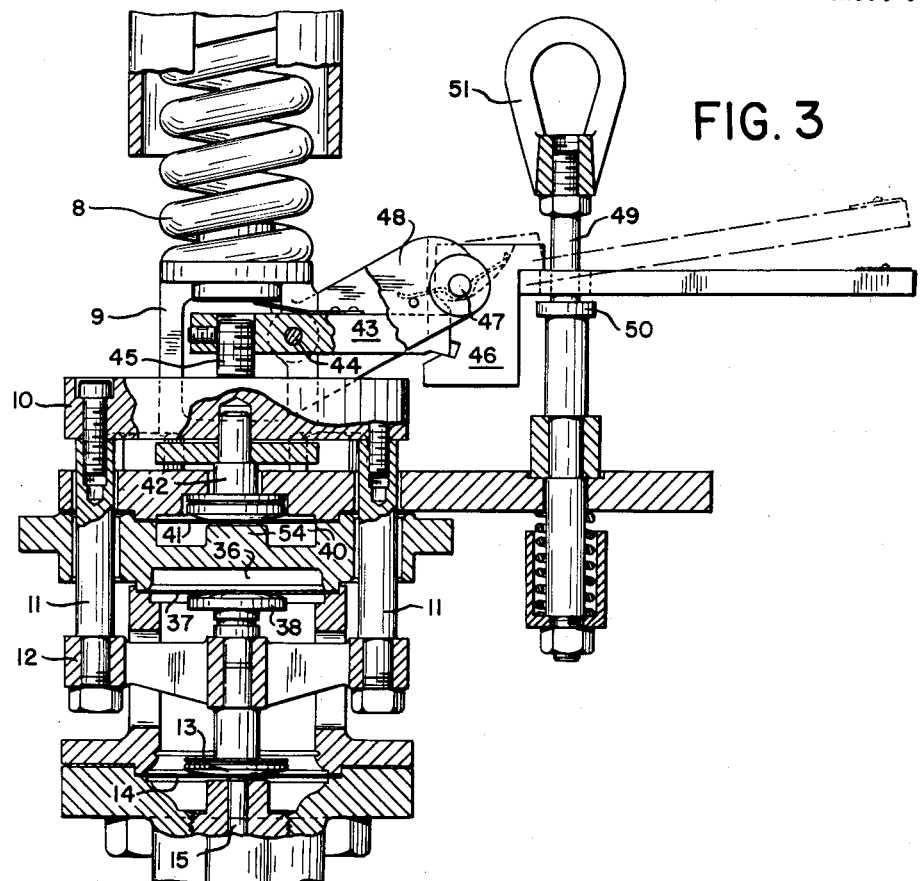
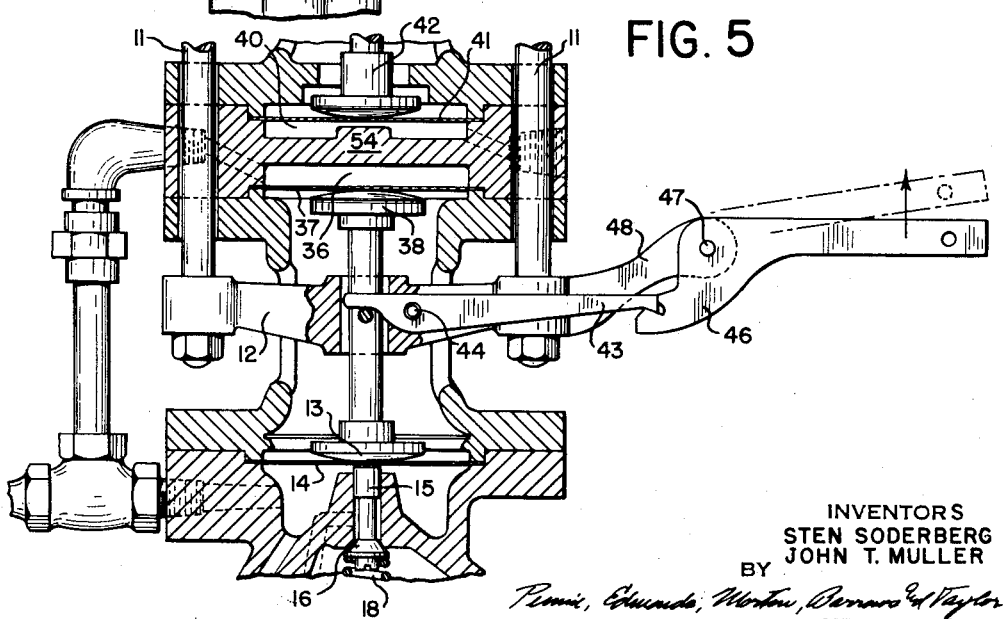

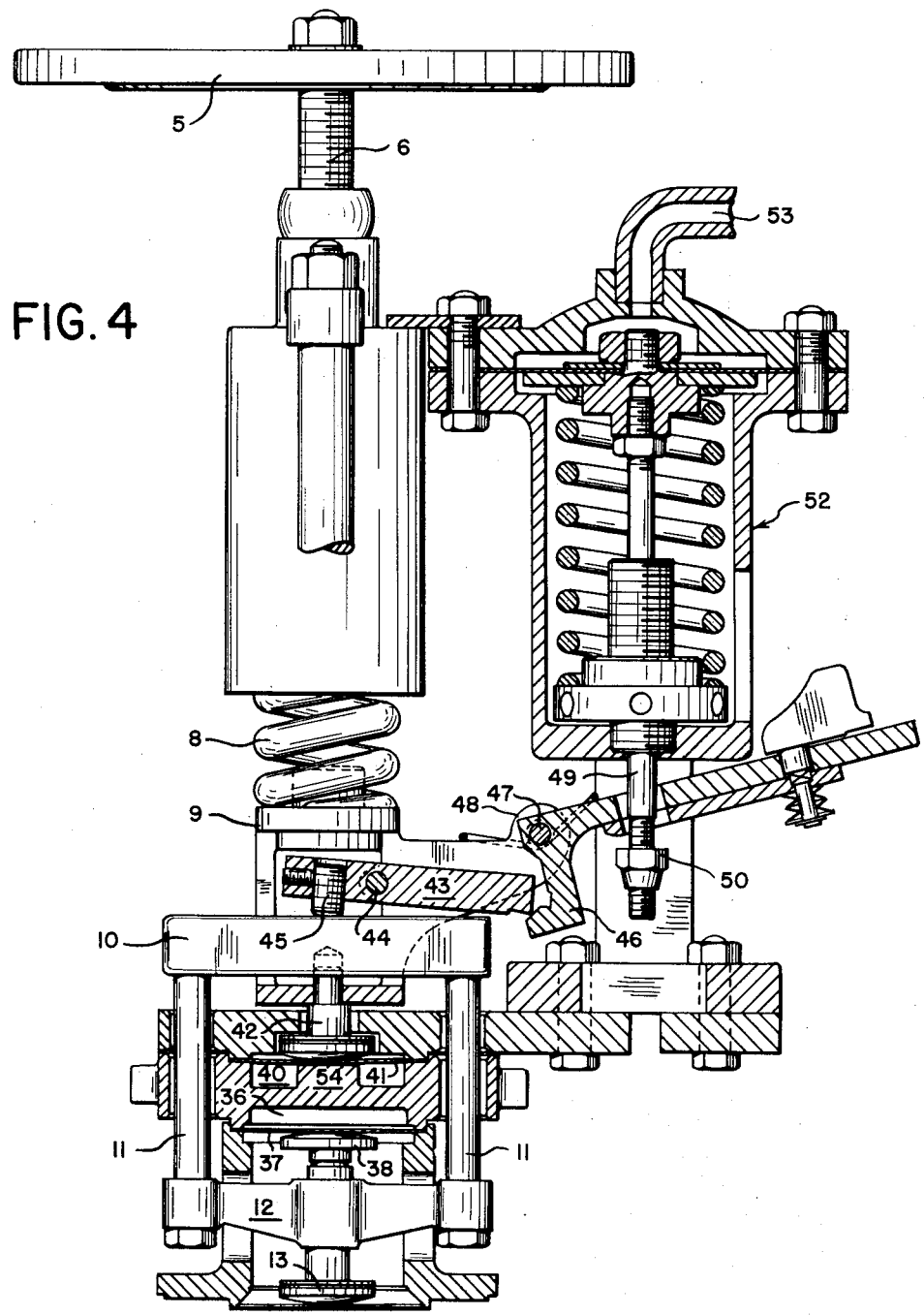

3,137,474
SHUT-DOWN DEVICE FOR PUMP PRESSURE REGULATOR

Sten Soderberg and John T. Muller, Nutley, N.J., assignors to Leslie Co., Lyndhurst, N.J., a corporation of New Jersey
Filed Apr. 18, 1961, Ser. No. 103,894
3 Claims. (Cl. 251—67)

This invention relates to pump pressure regulators and, more particularly, to a shut-down device for pump pressure regulators.

In the United States patent to Soderberg No. 1,745,917 there is described a type of pump pressure regulator which is in widespread use today. In this regulator, a spring loaded yoke tends to open a control valve which admits steam from the inlet side of a main valve to a piston which opens a spring-loaded main valve. The steam passes from the outlet side of the main valve to a pump, and the discharge pressure from the pump acts upon a diaphragm in opposition to the yoke spring so that when the pump discharge pressure reaches a predetermined value it moves the yoke in a direction to close the control valve which, in turn, permits the piston to return to the closed main valve position. In spite of the efficacy of this type of pressure regulator, there has been a need for a shut-down device which would permit, or cause, the regulator to be shut down when an undesirable pump operation condition should arise.

We have now developed such a shut-down device which can be operated either manually or automatically. This device comprises a displaceable key member forming an interconnection between the spring-loaded yoke and the valve stem of the control valve, a key supporting means for holding the key in position to provide operative interconnection between the yoke and the valve stem, and releasing means for releasing the key supporting means so as to disengage the yoke from its interconnection to the valve stem.

These and other novel features of our invention will be readily understood from the following description taken in conjunction with the accompanying drawings in which FIG. 1 is a front elevation, with parts broken away, of a pump pressure regulator embodying the shut-down device of our invention;

FIG. 3 is a partial side elevation of the apparatus shown in FIG. 2;

FIG. 4 is a partial side elevation similar to FIG. 3 but showing the shut-down device in the shut-down condition and further showing an automatic control for the shut-down device; and FIG. 5 is a partial side elevation similar to FIG. 3 showing the use of our novel shut-down device with a differential pump pressure regulator such as that shown in FIG. 4 of United States Patent No. 1,745,917.

Figure 1:
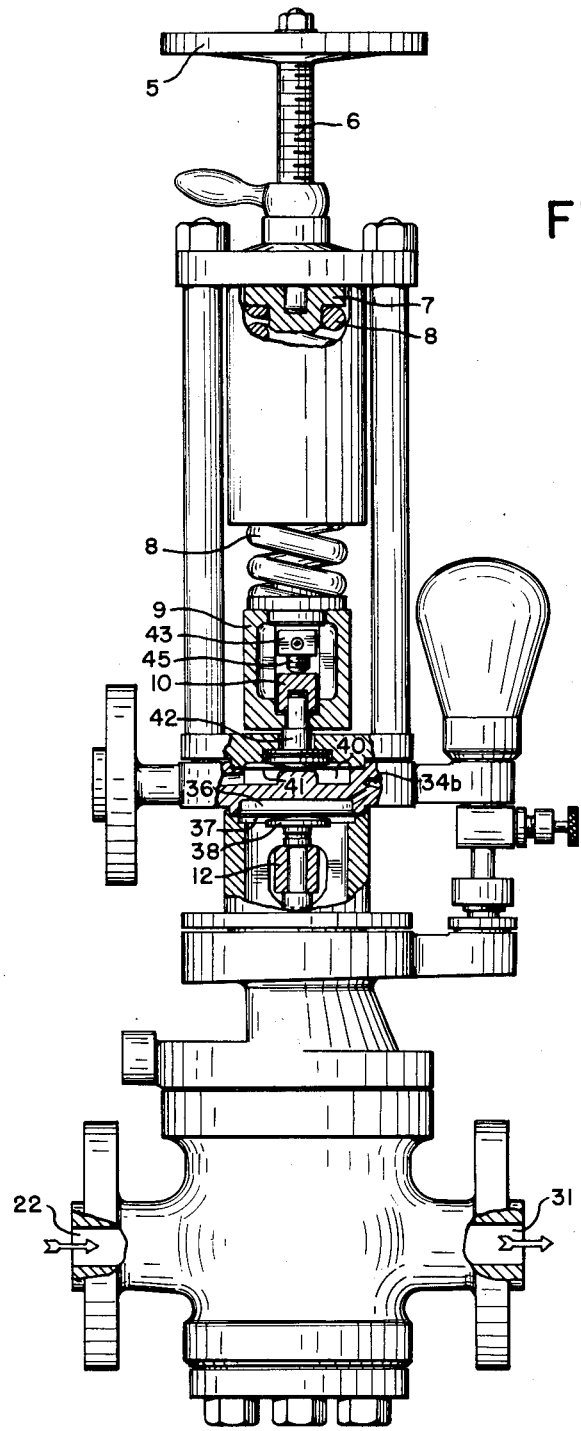
Figure 2:
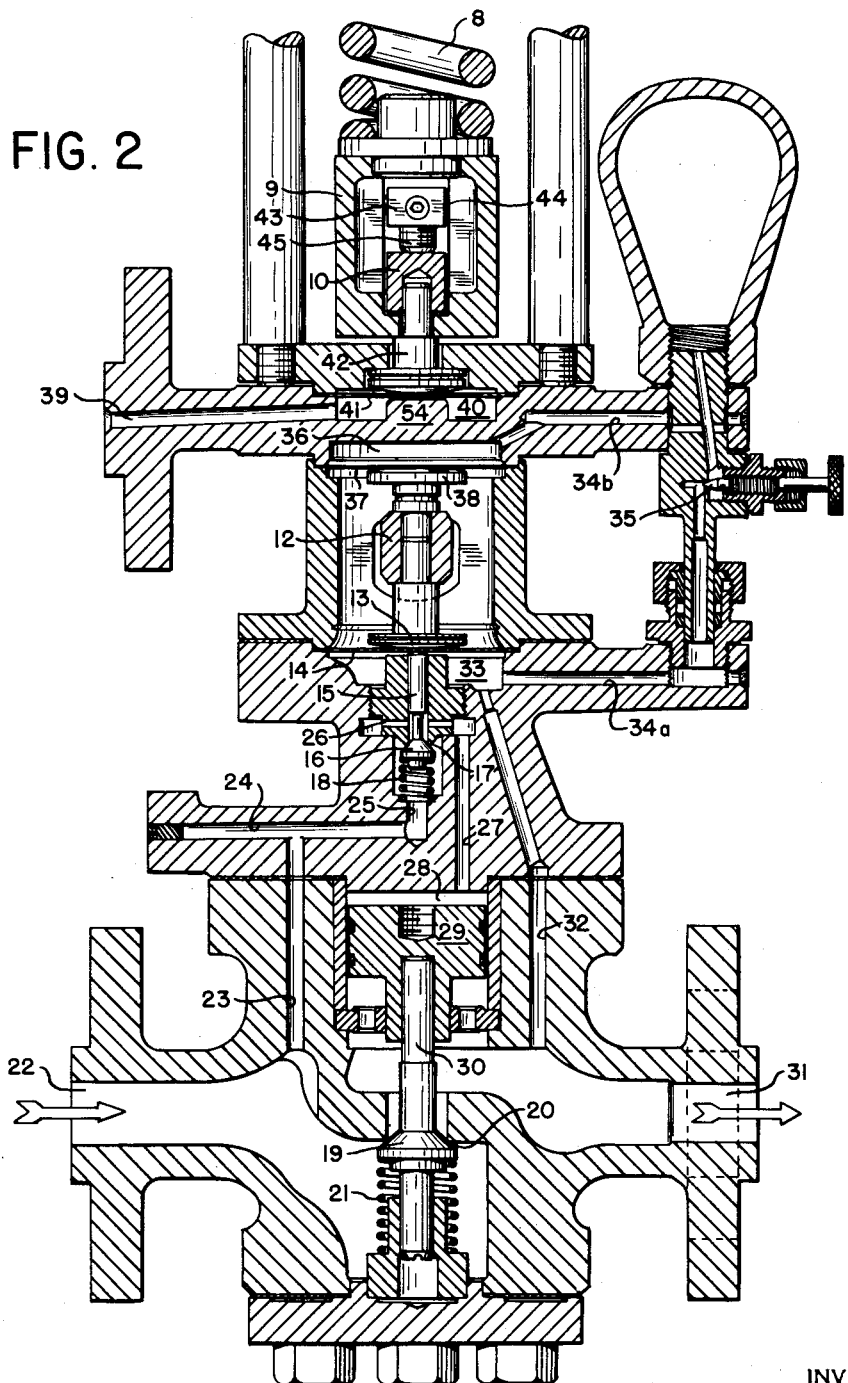
FIG. 2 is a partial front sectional elevation of the apparatus shown in FIG. 1.

In the pump pressure regulator shown in FIGS. 1, 2 and 3, a handwheel 5 on a threaded shaft 6 acts, when turned in the required direction, to force an upper spring collar 7 downwardly and thus increase the compression of a coil spring 8 engaging a lower yoke spring collar frame 9. This frame is connected, as described hereinafter, to an upper crosshead 10 of the control valve yoke. The remainder of the yoke comprises connecting rods 11 engaging a lower yoke crosshead 12. The lower crosshead is secured to a diaphragm button 13 which acts downwardly against a lower diaphragm 14. The under surface of this diaphragm presses against the top of a valve stem 15 for a control valve 16. The valve is urged upwardly against its seat 17 by a coil spring 18.

Operation of the control valve 16 governs the operation of the main valve 19 which is urged upwardly against its seat 20 by a coil spring 21. Steam enters the inlet port 22 of the main valve and passes through ports 23, 24 and 25 to the control valve chamber. When the handwheel 5 is turned to force the yoke downwardly, the control valve 16 is opened so that the inlet steam can pass through ports 26 and 27 into a chamber 28 where it acts on the head of a piston 29 mounted on the top of a valve stem 30 connected to the main valve 19. The inlet steam pressure thus acts to open the main valve 19 when the control valve 16 is opened. The inlet steam supply then passes through the main valve into the main valve outlet port 31 whence it passes to and operates a steam driven pump.

The steam in the main valve outlet also is free to pass through a port 32 into a chamber 33 below the lower diaphragm 14. By providing an additional port 34a leading from the chamber 33 to a needle valve 35 and thence through a port 34b to another chamber 36 above the lower crosshead 12 of the yoke, and by providing the chamber 36 with a diaphragm 37 acting on a button stem 38 bearing against the top of the lower crosshead 12, the effect of the pump supply steam pressure on the yoke (and hence on control valve 16) is neutralized.

Operation of the control valve 16 is effected by the discharge pressure from the pump which communicates through a port 39 to a third chamber 40. This chamber 40 is provided with a diaphragm 41 which acts upwardly against a button stem 42. In this way the upward force of the pump discharge pressure acting on diaphragm 41, together with the upward force of the control valve spring 18, counterbalances the yoke spring 8. Thus, by adjustment of the handwheel 5 the compression of the yoke spring 8 can be selected to counterbalance any desired pump discharge pressure so that the regulator will open or close the main valve 19 as required in order to maintain this pump discharge pressure.

The shut-down device for the pump pressure regulator is advantageously mounted in the lower yoke spring collar frame 9 at the top of the yoke and provides the aforementioned interconnection between the frame collar 9 and the control valve yoke. This shut-down device comprises a displaceable key member in the form of a trip arm 43 pivotally mounted on a pin 44 secured to the frame 9. A portion of the trip arm 43 extends inside of the frame 9 and is provided with an adjustable contact screw 45 which projects downwardly from the trip arm into contact with the top of the upper crosshead 10 of the control valve yoke. Thus, when the trip arm 43 is held in fixed operative position with respect to the frame 9, the yoke moves with the frame and the action of the yoke spring 8 is communicated to the yoke and thence to the control valve 16.

The trip arm 43 of the shut-down device of our invention is locked in this operative position by a trip latch 46 pivotally mounted on a pin 47 which is carried by an arm 48 secured to the yoke spring frame 9. The trip latch 46 is actuated by upward movement of a shaft 49 carrying a collar or nut 50. When the shaft 49 is raised, either by manually, mechanically, hydraulically or pneumatically pulling upwardly on a pull ring 51 as shown in FIG. 3 or by an automatic control device 52 operated by a line connection 53 to the suction side of the pump as that shown in FIG. 4, the trip latch 46 pivots so that its lower end disengages the trip arm 43. The trip arm, under the pressure of the control valve spring 18, pivots in a direction in which the inner end of the arm within the yoke spring frame 9 rises. The pressure of the yoke spring 8 against the top of the upper crosshead 10 of the yoke is thus relieved so that the control valve spring 18 closes the control valve and thereby closes the main valve 19. The yoke spring nevertheless continues to urge the yoke frame 9 and the button stem 42 downwardly until the diaphragm 41 hits a stop 54 in the chamber 40. The yoke is restored to operative condition simply by resetting the trip latch 46 in contact with the trip arm 43.

It will also be readily understood that our shut-down device is not limited to use with a constant pressure type regulator such as that shown in FIGS. 1 and 2 herein (as in FIGS. 1 and 2 of the aforementioned patent) but is equally adapted for use in a differential or excess pressure type regulator (such as in FIGS. 3 and 4 of the patent) as is clearly shown in FIG. 5 herein.

It will be seen, accordingly, that the shut-down device of our invention provides an immediate shut-down of the control regulator, either by automatic or non-automatic means, without impairing or impeding subsequent operation of the regulator as soon as the condition which necessitated the shut-down has been remedied.

We claim:

1. In a pressure regulator including a control valve; a yoke, a control valve stem in operative engagement with one end of the yoke spring operatively connected to the other end of the yoke and adapted to urge the control valve into one fluid-control position, a control valve spring operatively connected to the control valve and adapted to urge the control valve into another fluid-control position, and a diaphragm in operative engagement with the yoke and adapted in response to a controlling fluid pressure to combine with the control valve spring in resisting the action of the yoke spring, a shut-down device which comprises a frame member interposed between the yoke spring and the yoke for transmitting the force of the spring to the yoke to actuate the control valve, the frame member being spaced from the yoke, a trip arm extending crosswise of the frame member and pivoted thereto intermediate its ends, a trip latch mounted on the frame member for engaging one end of the trip arm for locking the arm in operative position, the opposite end of the arm when in such position engaging the yoke and serving to transmit motion of the frame to the yoke to open the control valve, and releasing means for releasing the trip latch so as to permit the trip arm to pivot and thus relieve the pressure of the yoke spring on the yoke and thereby permit the control valve to close.

2. Apparatus according to claim 1 in which the said opposite end of the trip arm is provided with an adjustable screw projecting toward the yoke and adapted to provide control of the space between the yoke and the trip arm in its operative position.

3. Apparatus according to claim 1 in which the frame member has a predetermined limited freedom of movement with respect to the yoke which is provided by release of the trip arm from its operative position, the frame member being spaced from the yoke by a distance less than the extent of such movement when the trip arm is in its operative position.

References Cited in the file of this patent
UNITED STATES PATENTS

| | | |
|---|---|---|
| 1,745,917 | Soderberg | Feb. 4, 1930 |
| 2,718,899 | Goddard | Sept. 27, 1955 |

FOREIGN PATENTS

| | | |
|---|---|---|
| 191,599 | Great Britain | Jan. 18, 1923 |

UNITED STATES PATENT OFFICE
CERTIFICATE OF CORRECTION

Patent No. 3,137,474 June 16, 1964

Sten Soderberg et al.

It is hereby certified that error appears in the above numbered patent requiring correction and that the said Letters Patent should read as corrected below.

Column 3, line 22, after "yoke" insert -- , a yoke --.

Signed and sealed this 20th day of October 1964.

(SEAL)
Attest:

ERNEST W. SWIDER
Attesting Officer

EDWARD J. BRENNER
Commissioner of Patents